US007003096B2

(12) United States Patent
Lashley et al.

(10) Patent No.: US 7,003,096 B2
(45) Date of Patent: Feb. 21, 2006

(54) FULL DUPLEX TELEPHONE SET USING ECHO CANCELLATION AND SIDE TONE MANAGEMENT FOR HIGH GAIN STABILITY

(75) Inventors: David G. Lashley, Cartersville, GA (US); Robert L. Doss, Ringgold, GA (US)

(73) Assignee: Plantronics, Inc., Santa Cruz, CA (US)

( * ) Notice: Subject to any disclaimer, the term of this patent is extended or adjusted under 35 U.S.C. 154(b) by 217 days.

(21) Appl. No.: 10/243,292

(22) Filed: Sep. 12, 2002

(65) Prior Publication Data

US 2004/0052358 A1    Mar. 18, 2004

(51) Int. Cl.
    *H04M 9/08* (2006.01)
(52) U.S. Cl. .................. 379/406.01; 379/391
(58) Field of Classification Search .......... 379/406, 379/388, 390, 391, 392, 406.01; 455/570
    See application file for complete search history.

(56) References Cited

U.S. PATENT DOCUMENTS

| | | | |
|---|---|---|---|
| 4,596,899 A * | 6/1986 | Wojcik et al. ........... 379/52 |
| 5,734,713 A | 3/1998 | Mauney et al. |
| 5,896,451 A | 4/1999 | Deas |
| 6,041,118 A * | 3/2000 | Michel et al. ........... 379/391 |
| 6,282,176 B1 | 8/2001 | Hemkumar |
| 6,539,091 B1 * | 3/2003 | Schertler ............. 379/406.08 |
| 6,711,259 B1 * | 3/2004 | Haimi-Cohen et al. .... 379/391 |
| 6,751,203 B1 * | 6/2004 | Eshmawy et al. ......... 370/286 |
| 6,768,795 B1 * | 7/2004 | Feltstrom et al. ......... 379/391 |
| 2002/0090078 A1 | 7/2002 | Feltstrom et al. |

FOREIGN PATENT DOCUMENTS

AU    645860 B    1/1994

OTHER PUBLICATIONS

Patent Abstracts of Japan vol. 011, No. 306 (E-546), Oct. 6, 1987.
David Messerschmitt et al., Digital Voice Echo Canceller with a TMS32020, copyright 1997 (no month).

* cited by examiner

*Primary Examiner*—Sinh Tran
*Assistant Examiner*—Walter F Briney III (57) ABSTRACT

A full duplex telephone set for hearing impaired users includes a digital signal processor incorporating a pair of adaptive transversal filters to cancel line and acoustic echo feedback from the tip and ring signals of the set, and to condition and control the amount of a replacement side tone fed back to the receiver. This enables at least 50 dB of gain to be applied to the modified received signal without initiating unstable operation, or howl, in the set, and ensures that the received and side tone signals are heard by the user with equal comfort and clarity. The digital signal processor also enables additional enhancements to be made to the modified received signal that are beneficial to hearing impaired users, such as dynamic range compression, "soft" limiting, and low level emphasis within selectable frequency bands.

18 Claims, 4 Drawing Sheets

FULL DUPLEX TELEPHONE SET USING ECHO CANCELLATION AND SIDE TONE MANAGEMENT FOR HIGH GAIN STABILITY

RELATED APPLICATIONS

This application is related to U.S. patent application Ser. No. 10/243,003, filed Sep. 12, 2002, now U.S. Pat. No. 6,721,404, issued Apr. 13, 2004.

BACKGROUND

1. Technical Field

This invention relates to telephony in general, and in particular, to a telephone set for hearing impaired users that provides full duplex operation while supplying at least 50 dB of gain to a received signal without inducing unstable operation, or "feedback howl," in the set.

2. Related Art

Figure 1:
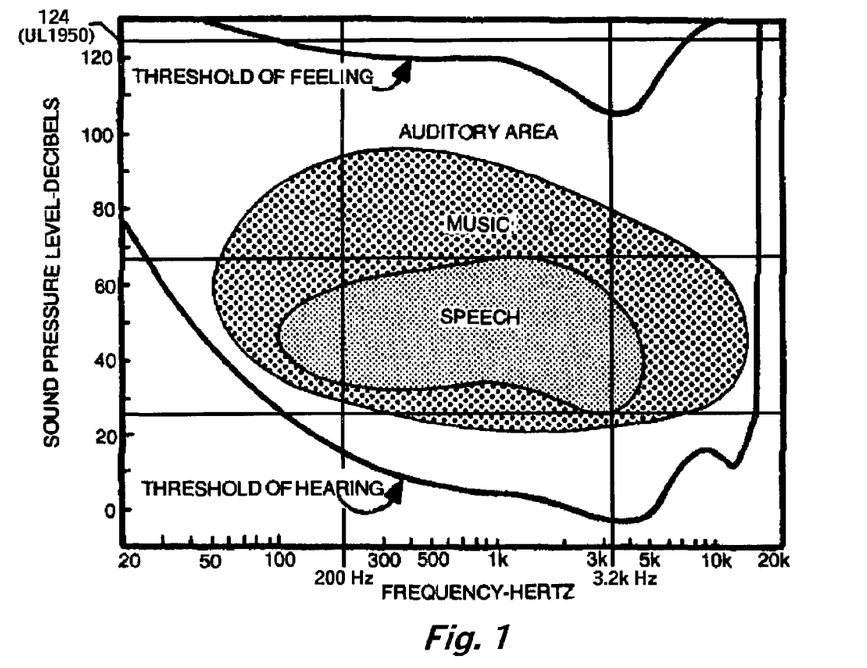
FIG. 1 is a graphical representation of the auditory area of a subject having normal, average hearing, in terms of the frequency and intensity ranges of sounds that are audible to the subject and the areas subsumed therein within which music and speech occur.

A graphical representation of the "auditory area" of a young, adult subject with normal, average hearing is shown in FIG. 1 in terms of the frequency and intensity ranges of sounds that are audible to the subject. As shown in the figure, the auditory area is bounded, in terms of audible frequencies, between about 20 Hz and 18 kHz.

In terms of intensity, as measured in decibels ("dB") relative to a reference sound pressure level ("SPL") of 20 micro-Pascals (20 $\mu$Pa), the auditory area is bounded between two roughly upwardly-concave curves. The lower of these demarcates the "threshold of hearing" level, below which sounds are inaudible, and the upper curve demarcates the "threshold of feeling" level, at which sounds begin to produce a tickling sensation in the ear. Sounds with intensities above the threshold of feeling can cause pain and permanent damage to the ear. For this reason, Underwriters Laboratories, Inc., has promulgated a safety standard for telephones (UL 1950, $3^{rd}$ ed.) that fixes an upper limit of 124 dB SPL on the intensity of sound that the earphone, or receiver, of a UL-certifiable telephone can produce, as shown in FIG. 1.

Subsumed within the auditory area of FIG. 1 are two overlapping regions of interest in the field of sound reproduction. The first of these is the area within which all sounds normally associated with the psycho-acoustic phenomenon of music occur, and the second, which is subsumed within the first, is the area within which all sounds normally associated with the psycho-acoustic phenomenon of speech occur.

It may be seen that the speech auditory area is considerably smaller than the music auditory area, and extends from about 100 Hz to about 6 kHz in frequency, and from about 25 dB to about 70 dB SPL in intensity. Moreover, it has been found that good speech intelligibility can be obtained with a minimal loss in sound quality, and with a substantial savings in transmission bandwidth, by limiting the telephonic bandwidth, or "pass band," to about 3 kHz, with frequencies ranging from between about 200 Hz to 3.2 kHz. Thus, all telephonic speech sounds can be thought of as occurring within the rectangular "pass window" outlined FIG. 1 between 200 Hz and 3.2 kHz on the frequency axis, and between about 25 dB and 70 dB SPL on the intensity, or "volume" axis.

Figure 3:
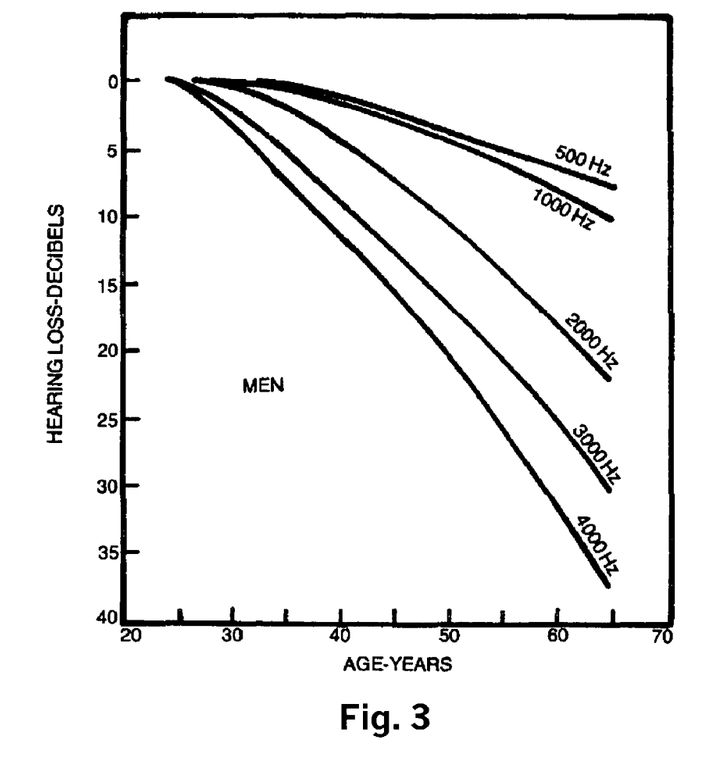
FIG. 3 is a graphical representation of the average loss in hearing at various frequencies, in dB SPL, incurred by men with age, in years.
Figure 4:
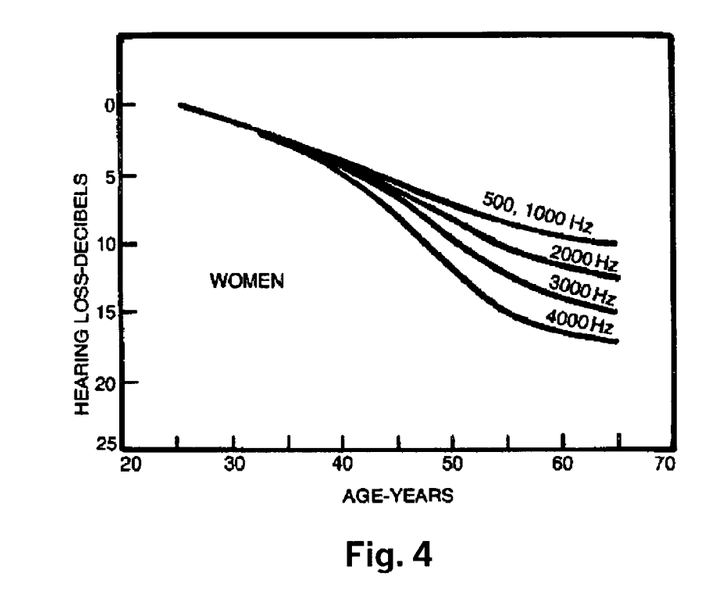
FIG. 4 is a graphical representation of the average loss in hearing, in dB SPL, incurred by women at various frequencies, with age, in years.

All persons suffer some deterioration in the acuity of their hearing with age, men more so than women, as is illustrated in FIGS. 3 and 4, respectively, where the average deterioration in hearing in decibels at given frequencies with age in years are respectively plotted for men and women subjects. As may be generally inferred from FIGS. 3 and 4, more than 80% of individuals who experience a loss in hearing suffer from a loss in the high frequency range, which, for telephonic hearing, is defined to extend from about 1.8 to 3.2 kHz. Hearing losses may also be caused by other factors not related to age, including heredity, injury, and disease.

Figure 2:
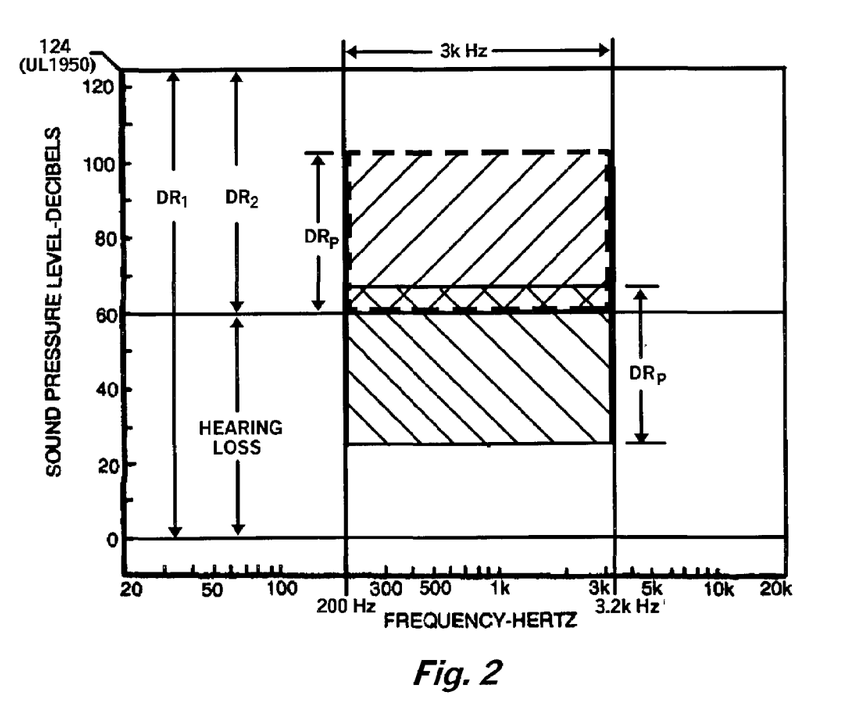
FIG. 2 is a graphical representation of a telephonic speech pass window, in terms of the frequency and intensity ranges of the sounds occurring therein, and showing the partial masking effect thereon of a flat, 60 dB hearing loss.

The telephonic speech pass window of FIG. 1 is reproduced in FIG. 2, which illustrates the effect of a "flat," 60 dB hearing loss on telephonic communications. It may be seen that such a loss reduces a normal dynamic range of hearing $DR_1$ of about 124 dB to a residual dynamic range $DR_2$ of about 64 dB, thereby effectively "masking" a substantial portion of the telephonic speech pass window (shown by the solid outline), which has a dynamic range $DR_p$ of about 45–50 dB. Thus, nearly 80% of the telephonic speech received by an individual with such a hearing loss is inaudible to the individual, and therefore, lost. Accordingly, one of the principal objects of any hearing-assistive device, such as a hearing aid or hearing assistive telephone, is to shift the received speech program window upwards such that its dynamic range $DR_p$ falls within the remaining dynamic range $DR_2$ of a hearing-impaired listener, as shown by the dashed outline in FIG. 2. In so doing, it may also be necessary to reshape the window, as with compression and limiting, such that it fits within that range.

The above object can be partially achieved in an amplified telephone set, such as the prior art amplified telephone set 10 illustrated schematically in FIG. 5 and discussed in more detail below, by simply adding linear gain, or amplification, to the received signal. However, because of unpredictable levels of feedback in the system, including "line echo," "side tone," and "acoustic echo," there are at least two substantial limitations to this solution: First, since the telephone set forms part of a closed loop, not more than about 30 dB of gain can be added to the received signal without exceeding a total closed loop gain of unity, thereby inducing unstable operation, or "howl," in the telephone, that is similar to that set up in a public address ("PA") system when the microphone is placed too close to the output of the speaker. However, as may be seen from FIG. 2, as much as 45–50 dB of gain may be needed to completely shift the received signal's pass window into a hearing impaired user's remaining dynamic range of hearing, leaving a substantial deficit in the required amplification of 15–20 dB.

Second, the level of the hearing impaired user's transmitted signal that is fed back to the user in the form of line echo and side tone varies greatly and seldom matches that of the signal received by the user from a far-end talker. If the user adjusts the amplification of the set such that one of these signals is heard comfortably, the other signal may be either inaudibly soft, i.e., not heard, or heard uncomfortably loud and distorted. While these drawbacks can be addressed to a certain extent by so-called "echo suppression" techniques, i.e., switching circuits that prevent the user from transmitting and receiving at the same time, this not only can add "switching artifacts" to the conversation, i.e., annoying pops and clicks, but it also reduces the hearing-impaired user's communication from "full-duplex," in which he can both transmit and receive simultaneously, to "half-duplex," in which all side tone is effectively eliminated. Since side tone provides important telephonic and voice modulation cues to the speaker, hearing-impaired persons need side tone as much or more than persons with normal hearing for effective communication.

Accordingly, a long felt and as yet unsatisfied need exists for a telephone set for hearing impaired users that affords the user with effective full duplex communication, and that enables as much 50 dB of gain to be applied to the received signal without inducing feedback howl in the set.

SUMMARY

In accordance with the present invention, a telephone set is provided for hearing impaired users that affords effective full duplex operation, and yet enables as much 50 dB of gain to be applied to the received signal without inducing feedback howl in the set.

One exemplary embodiment of the novel telephone set comprises a base part, and a handset or a headset portion incorporating a receiver and a transmitter. A portion of the signal received by the receiver is coupled onto a signal transmitted by the transmitter as an acoustic echo signal. A hybrid located in the base portion couples the set to the two-wire analog tip and ring signals of the local loop, and also couples a portion of the transmitted signal back to the receiver as a conventional side tone signal. The received signal also includes a portion of the transmitted signal that is reflected back to the set from the local loop as a line echo signal.

Two codecs are arranged in the base portion to convert the respective received and transmitted signals of the telephone set between analog and digital formats. The base portion also includes a digital signal processor within which, among other functions, four filters are implemented. A first one of the filters is arranged to filter substantially all line echo and conventional side tone signals from the signal received by the receiver. A second one of the filters is arranged to filter substantially all acoustic echo signals from the signal transmitted by the transmitter. A third one of the filters is arranged to control the level of the filtered transmitted signal and then combine it, as a "replacement" side tone signal, with the filtered received signal to form a modified received signal. A fourth one of the filters comprises a receiver audio processor arranged to enhance the modified received signal by amplifying it, compressing its dynamic range, and limiting its maximum level "softly," i.e., without introducing non-linearities into the signal.

In one exemplary preferred embodiment of the telephone, each of the first and second filters comprises an adaptive transversal filter. Each of these, in turn, comprises a sampler for sampling each of a reference signal and an object signal onto which at least a portion of the reference signal has been coupled as an echo signal. A computer generates a replica of the echo signal from the reference signal, subtracts it from the object signal, and generates an error signal corresponding to the difference between the echo signal and the replica signal. The computer includes an algorithm that operates on the error signal and previous values of the replica signal to successively adapt the replica signal in such a way that the error signal progressively approaches zero.

By canceling out the feedback elements of the closed loop, including the conventional side tone, and then feeding the filtered transmitted signal back to the receiver in a controlled manner as a replacement side tone, the filters enable more than 50 dB of gain to be added to the modified received signal without exceeding a total loop gain of unity, i.e., without inducing unstable operation of the telephone set, and further, ensure that both the replacement side tone signal and the signal received from the far-end talker are heard by the user with an identical clarity and comfort.

A better understanding of the above and other details and advantages of the novel telephone set may obtained by a consideration of the detailed description below of an exemplary preferred embodiment thereof, particularly if such consideration is taken in conjunction with the figures of the appended drawings.

DETAILED DESCRIPTION

Figure 5:
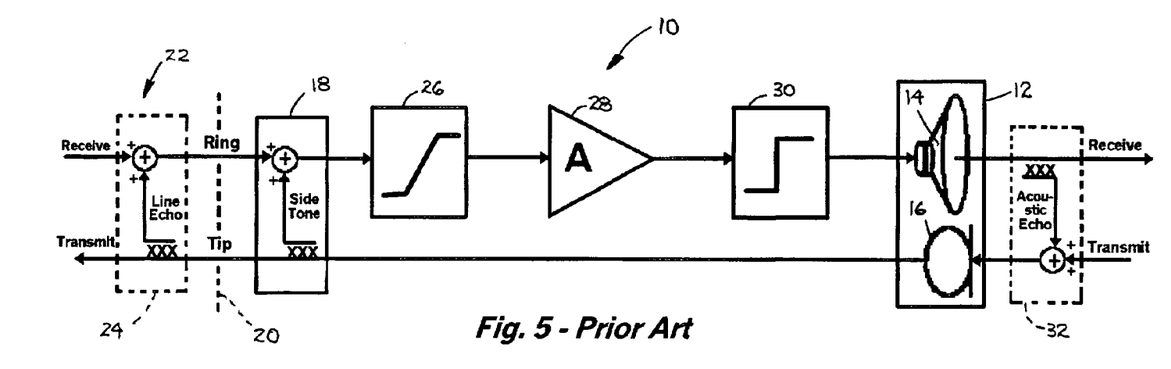
FIG. 5 is a schematic, block diagram representation of a prior art amplified telephone set for hearing impaired users.

A prior art amplified telephone set 10 for hearing impaired users is illustrated schematically in FIG. 5, and is described in more detail in, e.g., U.S. Pat. Nos. 4,191,861; 4,666,120; and, Re. 33,309 to W. F. Walker, Jr., et al., which are commonly owned by the assignee hereof. The exemplary prior art telephone 10 illustrated has been simplified for discussion purposes by omitting certain conventional telephone set mechanisms used for signaling and switching, including, e.g., dialing, ringing, and switchhook mechanisms.

The conventional amplified telephone set 10 comprises a handset or headset 12, which includes an earphone, or receiver 14, for converting a received electrical signal into a corresponding sound, and a microphone, or transmitter 16, for converting a transmitted sound into a corresponding electrical signal. The set 10 also includes a hybrid 18, sometimes called a "two-to-four-wire converter," for coupling the set, shown located to the right of the dashed line 20, to the two "tip" and "ring" wires of the "local loop" 22 of the telephone company service provider ("Telco"), located to the left of the dashed line.

The local loop comprises an analog DC circuit upon which an analog AC signal received from a remote, or far-end, talker (not shown), and an analog AC signal transmitted by the user to the far-end talker, are both superimposed, preferably sequentially, and not simultaneously. The hybrid 18 thus comprises a multi-tapped transformer that inductively couples the signals transmitted and received by the set 10 to and from the local loop 22, respectively. The local loop 22 also includes a loading coil 24 to match the respective input and output impedances of the telephone set 10 and the local loop 22 to each other as closely as possible, and thereby minimize the amount of the respective transmitted and received signals that are reflected back, or "soaked-up," by the wires in the loop. Nevertheless, depending on the location of the telephone set 10 within the local loop 22, a portion of the signal transmitted by the transmitter 16 of the set is reflected back as a "line echo" superimposed on the receive, or ring, signal.

The hybrid 18 in the telephone set 10 also couples a portion of the signal transmitted by the transmitter 16 of the set back onto the received signal as a "side tone" signal. The side tone signal comprises a form of intentional feedback to the user of a full duplex telephone set that enables the user to ascertain that a "connection," or communication circuit, is open between the user and a far-end respondent, and also to modulate the volume and speech formatives of the user's voice for effective communication. Thus, the signal received by the telephone set 10 has two elements of feedback of the transmitted signal superimposed on it, viz., the line echo and side tone signals.

In the amplified telephone set 10 of FIG. 5, the received signal is passed first through a high pass filter 26 to provide a form of pre-emphasis to the high-frequency portions of the signal, then through a linear amplifier 28 to add an adjustable amount of gain to it. A low-pass filter, or "hard" limiter 30, is disposed at the output of the amplifier 28 to prevent the acoustic output signal of the receiver 14 from exceeding the 124 dB SPL volume level mandated by the UL 1950 standard. The limiter 30 may be implemented by a pair of oppositely polarized diodes connected in parallel in the receiver circuit to act as a "clipper" at amplifier output signal levels exceeding a specified value. Such a limiter 30 is characterized as a "hard" limiter because, while it effectively prevents the output of the receiver from exceeding the maximum allowable value, the clipping of the amplified output signal introduces substantial harmonic distortions into the signal that can adversely affect its intelligibility. Accordingly, it is desirable to operate the telephone set 10 at signal levels below that at which such clipping begins.

A third feedback path extant in the telephone set 10 consists of the acoustic path 32 between the receiver 14 and the transmitter 16 of the handset 12, represented by a coupler contained in a dashed outline in FIG. 5, by which a portion of the acoustic output signal produced by the receiver is coupled onto the acoustic signal input of the transmitter as an "acoustic echo" signal. The acoustic echo signal does not ordinarily present a problem in conventional telephone sets, because the amount of the acoustic signal fed back to the transmitter 16 is small enough to preclude the total loop gain in the system from exceeding unity. However, in speakerphones and amplified telephones 10 such as that illustrated in FIG. 5, which incorporate substantial amplification of the received signal, this acoustic echo can present a problem in the form of unstable operation, or howl, in the telephone set when the gain added to the received signal is sufficient to cause the total loop gain in the set to exceed unity. This condition, in turn, provokes operation of the hard limiter 30, and effective communication is thereby precluded until the loop gain is reduced below the critical level.

While the prior art telephone set 10 partially addresses some of the problems of hearing impaired users, it also includes certain limitations that need to be overcome to provide such users with improved telephonic communication. One of these relates to the instability of the telephone at high gain levels. As a practical limitation, no more than about 30 dB of gain can be added to the received signal without inducing howl in the set, although as much as 45–50 dB of amplification may be required to meet the needs of many hearing-impaired users.

Another limitation relates to the typical mismatch between the highly variable levels of the acoustic echo and side tone signals and that of the signal received from the far-end talker, the former typically exceeding the latter appreciably. If the amplification of the set is adjusted such that the side tone is heard comfortably, the received signal may be either inaudibly soft and not heard, or alternatively, heard uncomfortably loud and distorted, thereby precluding consistent, effective communication.

Figure 6:
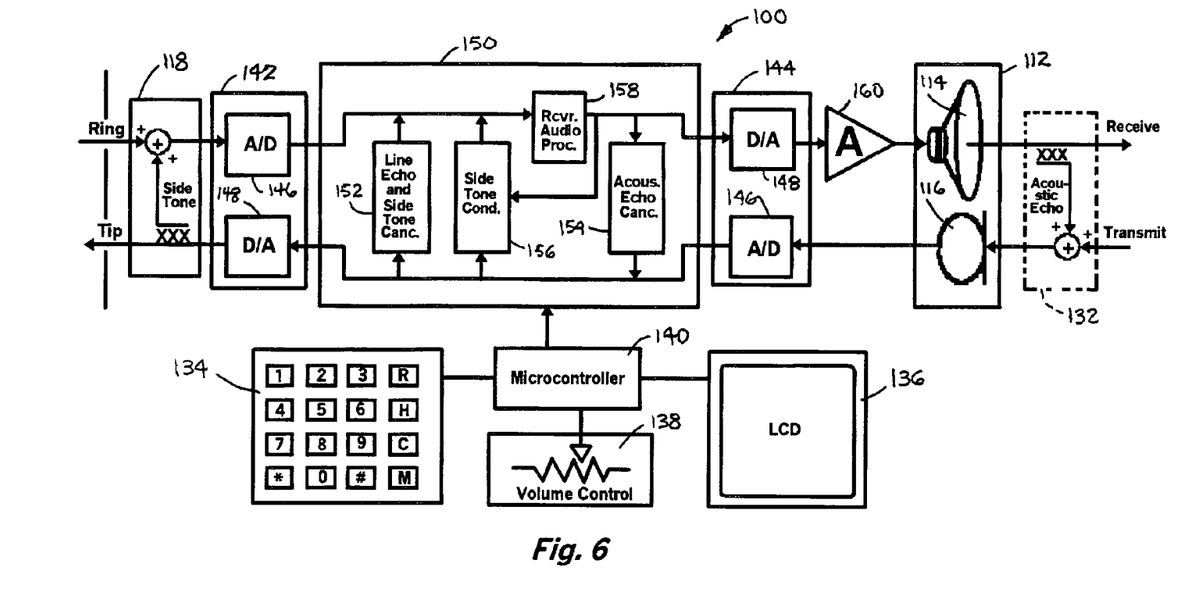
FIG. 6 is a schematic, block diagram representation of a full duplex telephone set for hearing impaired users incorporating a digital signal processor in accordance with an exemplary preferred embodiment of the present invention; and, FIG. 7 is a functional block diagram of the operation of the digital signal processor of the novel telephone set shown in FIG. 6.

An exemplary embodiment of a telephone set 100 for hearing impaired users in accordance with the present invention that overcomes the above and other problems of prior art amplified telephones is illustrated schematically in the functional block diagram of FIG. 6. As in the prior art telephone set 10 of FIG. 5, the exemplary telephone set 100 comprises a handset or headset 112 incorporating a receiver 114 and a transmitter 116, as well as a hybrid 118 for coupling the set to the tip and ring wires of the local loop (not illustrated). Also, as in the conventional set 10, the hybrid 118 couples a portion of the transmitted signal back onto the received signal as conventional side tone, and the receiver 114 and transmitter 116 define an acoustic path 132 by which a portion of the acoustic output signal produced by the receiver is fed back onto the acoustic signal input of the transmitter as an acoustic echo signal.

The telephone set 100 may also incorporate other conventional telephone features, such as a dual-tone multifrequency ("DTMF") dial pad 134 for dialing and data entry, a liquid-crystal display ("LCD") 136 for displaying a variety of information, such as telephone status, number dialed, caller ID, call waiting, programming steps, and the like, a manual volume control device 138, such as a rotatable or slidable knob, for the user's convenience in adjusting the volume of the receiver 114 acoustic output signal, and a micro-controller 140 for providing integrated control over the various functions and features of the set. The telephone set 100 may also include a quantity of erasable programmable memory ("EPROM") (not illustrated) for storage of frequently called numbers, as well as telephone set configuration data.

Unlike the conventional amplified telephone set 10 of FIG. 5, which is completely "analog" in nature, the exemplary telephone set 100 also comprises first and second codecs 142, 144 each comprising an analog-to-digital converter ("A/D") 146 and a digital-to-analog converter ("D/A") 148, for converting the respective received and transmitted signals of the set between analog and digital formats, and a digital signal processor ("DSP") 150 for processing those signals in the manner described below to achieve many of the advantages of the set.

The codecs 142, 144 may comprise conventional voice codecs, such as Texas Instruments, Inc. TLV 320AIC-series codecs, and may be incorporated on a single chip in a so-called "dual codec" of a type found in some digital stereo receivers. The DSP 150 may comprise, for example, a Texas Instruments, Inc. TMS320-series DSP. The DSP 150 may be embodied in a custom-designed, application specific integrated circuit ("ASIC"), a field-programmable gate array ("FPGA"), or a "hybrid" between the two types that is partly custom-designed and partly field-programmable.

As illustrated in FIG. 6, the DSP 150 of the telephone set 100 is programmed to implement, inter alia, four signal processing functions on the received and transmitted signals, viz., a first filter 152 arranged to filter substantially all line echo and conventional side tone signals from the signal received by the receiver 114, a second filter 154 arranged to filter substantially all acoustic echo signals from the signal transmitted by the transmitter 116, a third filter 156 arranged to "condition," i.e., to control the level of, the filtered transmitted signal such it matches that of the filtered received signal and then combine the controlled signal with the filtered received signal to form a modified received signal, and a fourth, receiver audio processor filter 158 arranged to enhance the modified received signal by, inter alia, amplifying, compressing, and "softly" limiting (i.e., without distorting) the modified received signal, prior to its introduction into the receiver 114.

A more detailed description of the operation of the first, second and third filters 152, 154 and 156 is given below in connection with FIG. 7.

With reference to FIG. 6, the processing applied to the signals received and transmitted by the telephone set 10 is summarized as follows: The analog ring signal, which comprises the analog signal received from a far-end talker, plus the analog line echo signal, is coupled into the set by the hybrid 118, which also couples the conventional analog side tone signal onto the ring signal, as described above. These combined analog received signals are then sampled, preferably at a rate of 8 kHz or better to avoid aliasing, by the A/D converter 146 in the first codec 142, and quantized into a corresponding digital signal. The digitized received signal is then processed, or filtered, by the first filter 152 to remove substantially all line echo and conventional side tone signals from the signal.

In a similar fashion, the analog signal transmitted by the transmitter 116, comprising the acoustic signal generated by the user's voice, plus the acoustic echo signal coupled from the receiver 114, is converted to a corresponding digital signal by the A/D converter 146 in the second codec 144. This digitized transmitted signal is then filtered by the second filter 154 to remove substantially all of the echo signal contained therein. The filtered transmitted signal is then "conditioned" by the third filter 156 in the manner described below such that its level closely matches that of the filtered received signal, and is then combined with the latter signal, as a "replacement side tone" signal, to form a modified received signal. The filtered transmitted signal is also converted to an analog format by the D/A converter 148 in the first codec 142 and coupled onto the tip wire of the local loop by the hybrid 118 as the analog signal transmitted by the set 100.

The modified received signal is filtered by the receiver audio processor filter 158, which amplifies, compresses, and limits the signal to enhance its audibility and clarity to the hearing impaired user. This enhanced received signal is then converted to an analog signal by the D/A converter 148 in the second codec 144, passed through a linear amplifier 160, which in the particular embodiment described herein, serves primarily to match the output impedance of the D/A converter to the input impedance of the receiver 114, and is then converted by the receiver to an enhanced acoustic signal heard by the hearing impaired user's ear.

It may be seen from the foregoing that, by filtering substantially all of the acoustic echo feedback from the transmitted signal, the telephone set 100 is effectively converted from a "closed-loop" system to an "open-loop" system, such that more than 50 dB of "open loop" gain can be added to the modified received signal by the receiver audio processor filter 158 without inducing feedback instability in the system. Additionally, effective full duplex operation of the set 100, in which both the replacement side tone signal and the signal received from the far-end talker are heard by the user with the same clarity and comfort, is achieved by first filtering substantially all of the line echo and conventional side tone signals from the received signal, and then replacing the conventional side tone signal with a conditioned side tone signal as described above.

The operation of the first, second, and third filters 152, 154 and 156 of the DSP 150 is described in more detail in connection with the functional block diagram of FIG. 7. In the particular exemplary preferred embodiment illustrated, each of the first and second filters 152, 154 comprises an "adaptive transversal filter" of a type described by D. Messerschmitt et al. in Texas Instruments Application Report SPRA129, 1989, the teachings of which are incorporated herein by this reference.

Figure 7:
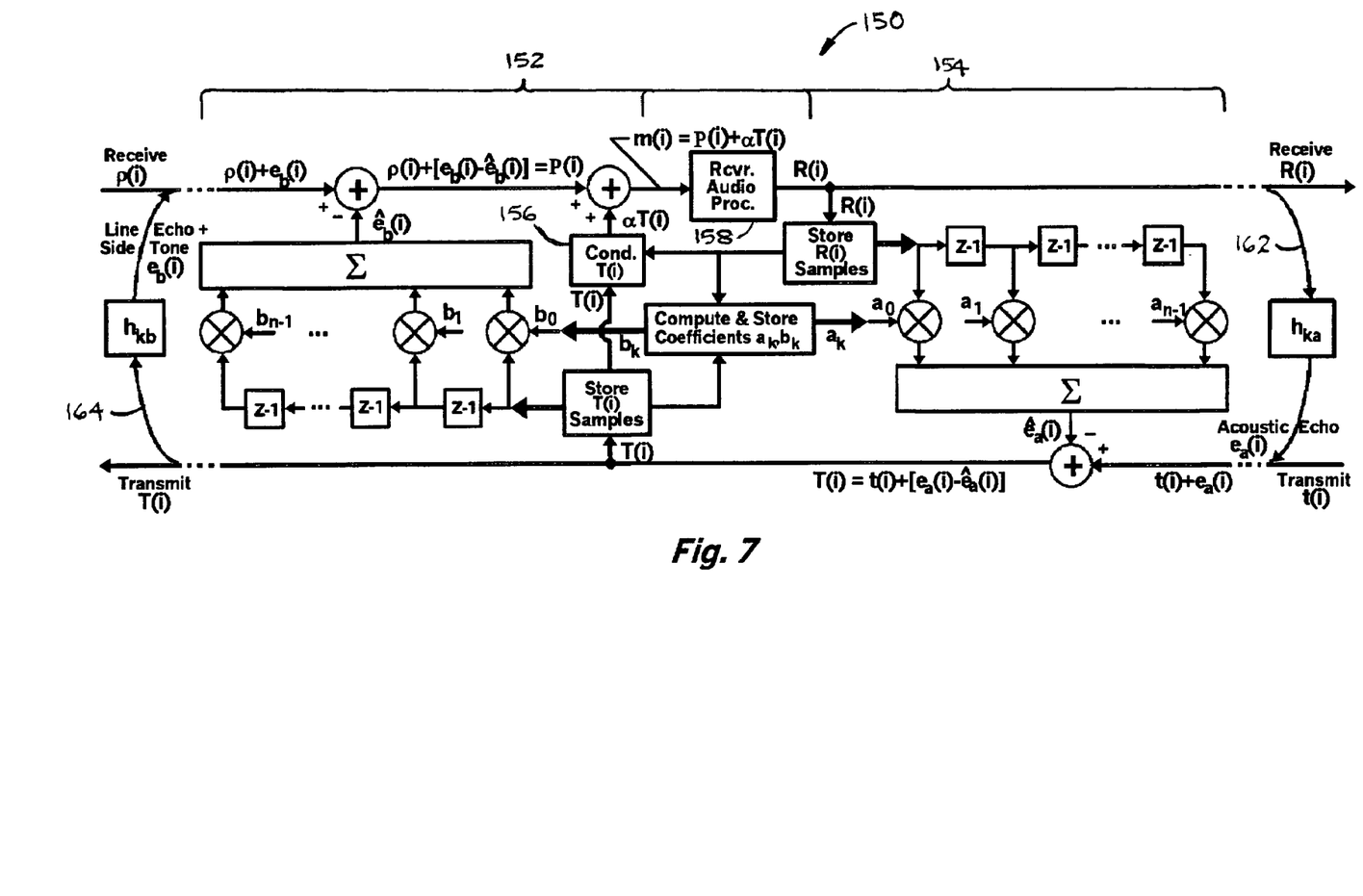

In FIG. 7, each of the relevant signals is shown in its discrete-time, or sampled, form f(i), i.e., after conversion by the respective A/D converters 146 of the codecs 142 and 144 (not shown in FIG. 7), where i is an integer multiplier of the period T of the samples, e.g., 0.125 milliseconds (ms) for the exemplary 8 kHz sampling rate. It may be noted from the above discussion that the line echo and conventional side tone signals that are respectively coupled onto the signal received from a far-end talker, $\rho(i)$, are both functions of, and hence, highly correlated with, the transmitted signal T(i), and accordingly, have been combined in FIG. 7 into a single line echo and side tone signal $e_b(i)$ The acoustic echo signal coupled onto the transmitted signal is likewise highly correlated with the enhanced received signal R(i), is represented by $e_a(i)$.

Assuming a linear, time-invariant (or slowly time-varying) system, the respective echo signals $e_a(i)$ and $e_b(i)$ that are coupled onto the respective "object signals" $\rho(i)$ and t(i) can be represented as the convolution of a respective "reference signal" to which they are correlated, viz., T(i) and R(i), and the respective discrete-time representation $h_{ka}$ and $h_{kb}$ of the unit impulse response of the respective echo paths 162 and 164 over which the echo signals are coupled to their respective object signals, as follows:

$$e_a(i) = \sum_{k=0}^{N-1} h_{ka} \cdot R(i-k),$$

$$\text{and, } e_b(i) = \sum_{k=0}^{N-1} h_{kb} \cdot T(i-k).$$

N consecutive values of the functions R(i–k) and T(i–k) can be generated by applying the respective signals R(i) and T(i) to a delay line having N taps, as shown in FIG. 7, and if the corresponding N values of the respective impulse responses $h_{ka}$ and $h_{kb}$ of the respective echo paths 162 and 164 are known, then exact replicas $\hat{e}_a(i)$ and $\hat{e}_b(i)$ of the respective echo signals $e_a(i)$ and $e_b(i)$ can be computed, which, when subtracted from their respective object signals, leave remaining signals from which the respective echoes have been cancelled exactly. Thus, as shown in FIG. 7, the remaining, or filtered, transmitted signal is given by T(i)=t(i)+[$e_a(i)$–$\hat{e}_a(i)$], and the remaining or filtered, received signal is given by P(i)=$\rho(i)$+[$e_b(i)$–$\hat{e}_b(i)$]. Further, it will be seen that the functions [$e_a(i)$–$\hat{e}_a(i)$] and [$e_b(i)$–$\hat{e}_b(i)$] respectively define error signals $\epsilon_a(i)$ and $\epsilon_b(i)$ that approach zero as the respective replica signals $\hat{e}_a(i)$ and $\hat{e}_b(i)$ more exactly replicate their respective echo signals $e_a(i)$ and $e_b(i)$.

The number of taps in the delay line is determined by the duration of the impulse response of the respective echo path, i.e., the time span over which it has a non-zero value. This is typically on the order of 2 to 4 ms, corresponding to from about 16 to 32 tap positions. However, echo paths incorporating significant delays require more taps for effective filtering. Thus, 128 taps are required to accommodate signals with delays of up to 16 ms, and in general, the more taps required, the more "computation-intensive" the filtering operation becomes.

The values of the respective impulse responses $h_{ka}$ and $h_{kb}$ of the respective echo paths 162 and 164 are generally not known in advance, and further, vary slowly with time. However, they can be approximated with respective "filter coefficients" $a_k$ and $b_k$, which, when progressively "adapted" to more accurately represent the actual values of the respective impulse responses $h_{ka}$ and $h_{kb}$, produce progressively more accurate replicas $\hat{e}_a(i)$ and $\hat{e}_b(i)$ of the echo signals $e_a(i)$ and $e_b(i)$.

An algorithm for progressively adapting the filter coefficients can be derived by minimizing the mean-squared error between the respective echo signal and its replica at a time when the respective signal components $t(i)$ and $\rho(i)$ of the respective object signals are respectively zero, i.e., when the user and the far-end respondent are respectively silent. One known recursive algorithm for adapting the respective coefficients in terms of a preceding value of the coefficient and the respective error signal $\epsilon(i)$, called the "least-mean-square" (LMS) algorithm, or the "stochastic-gradient algorithm," is given by $$a_k(i+1)=a_k(i)+2\beta[\epsilon_a(i)+R(i-k)],$$

$$\text{and } b_k(i+1)=b_k(i)+2\beta[\epsilon_b(i)+T(i-k)],$$

respectively, where $\epsilon_a(i)$ and $\epsilon_b(i)$ are the respective error signals discussed above, and $\beta$ is a constant proportional to the size of the "step" used in the approximation, where larger step sizes produce faster convergence but potentially larger residual echoes, and smaller step sizes result in slower convergence but smaller residual echoes. As will be appreciated by those of skill in the art, there are many other algorithms than can be advantageously applied to adapt the coefficients $a_k$ and $b_k$ of the filters 152 and 154, depending on the particular circumstances at hand.

As will also be appreciated, it is possible that the respective transmit and receive signal components $t(i)$ and $\rho(i)$ of the respective object signals of the echo-canceling first and second filters 152 and 154 will both be non-zero simultaneously, which occurs when both the user and the far-end respondent inadvertently talk at the same time, i.e., short, so-called "doubletalk" periods. When this occurs, it is necessary to "freeze" the adaptation of the respective filter coefficients $a_k$ and $b_k$ and temporarily use previously stored values of the coefficients to avoid divergence of the adaptive algorithm. This is effected by incorporating a "speech-detector" algorithm in the filters 152, 154 that detects simultaneous non-zero $t(i)$ and $\rho(i)$ signals, and instructs the respective filters to suspend the computation of filter coefficients and to use the previously stored values thereof during the periods that this condition exists.

As shown in FIG. 7, the third filter 156 conditions the filtered transmitted signal such that its level matches that of the filtered received signal in the following manner. During normal use, the hearing impaired user sets the volume level of the telephone set 100, i.e., the amount of gain added to the modified received signal m(i) by the receiver audio processor filter 158, such that the enhanced received signal R(i) is heard at a desired level of comfort. During this adjustment, the user is silent, so that the filtered transmitted signal T(i), and hence, the replacement side tone signal $\alpha T(i)$, are both zero. The modified received signal m(i) therefore consists entirely of the signal received from the far end talker, $\rho(i)$. Conversely, when the user is speaking, the far-end talker is silent, so that the signal received from the far end talker $\rho(i)$, and hence, the filtered received signal P(i), are both zero, and the modified received signal m(i) then consists entirely of the replacement side tone signal $\alpha T(i)$.

Thus, after the user has set the volume of the enhanced received signal R(i) to the desired level, the third, or replacement side tone conditioning filter 156 functions to monitor the level of the output signal R(i) from the receiver audio processor 158, and stores the level of that signal when t(i) is zero and $\rho(i)$ is non-zero. Thereafter, when $\rho(i)$ is zero and t(i) is non-zero, the side tone conditioning filter 156 compares the level of the signal R(i) with that of the previously stored values and either adds or subtracts the amount of gain or attenuation a to the filtered transmitted signal T(i) necessary to maintain the level of the enhanced received signal R(i) at the comfort level initially set by the user. The same speech detector algorithm used above to detect doubletalk can also be used to detect the status of $\rho(i)$ and t(i), and those of skill in the art will recognize this conditioning of the replacement side tone signal $\alpha T(i)$ as a form of "automatic gain control" ("AGC") that is applied only to the filtered transmitted signal T(i).

Those of skill in the art by now will also appreciate that many modifications and variations are possible in the apparatus and methods of the present invention without departing from its scope and spirit. For example, it is possible to filter noise from the received signal using known digital processing techniques in the DSP, thereby improving the signal to noise ratio of the receiver. Accordingly, the scope of the present invention should not be limited to that of the particular embodiments described and illustrated herein, as these are merely exemplary in nature, but rather, should be commensurate with that of the claims appended hereafter and their functional equivalents.

What is claimed is:
1. A full duplex telephone set, comprising:
   a receiver;
   a transmitter;
   a first filter arranged to filter substantially all line echo and conventional side tone signals from a signal received by the receiver;
   a second filter arranged to filter substantially all acoustic echo signals from a signal transmitted by the transmitter;
   a third filter arranged to match the level of the filtered transmitted signal to about that of the filtered received signal and to combine the two signals to form a modified received signal; and,
   a fourth filter arranged to enhance the modified received signal by effecting at least one of amplification, compression, and soft limiting thereof, and
   wherein the third filter comprises:
      means for detecting first periods during which the filtered transmitted signal is zero and the filtered received signal is non-zero;
      means for detecting second periods during which the filtered received signal is zero and the filtered transmitted signal is non-zero;
      means for measuring the level of the enhanced received signal and for storing the levels measured during the first periods; and,
      means for increasing or decreasing the level of the filtered received signal during the second periods such that the level of the enhanced received signal matches that of the enhanced received signal during the first periods.

2. The telephone set of claim 1, wherein at least one of the first and second filters comprises an adaptive transversal filter.

3. The telephone set of claim 2, wherein the adaptive transversal filter comprises:
means for sampling a reference signal and an object signal, wherein at least a portion of the reference signal is coupled onto the object signal as an echo of the reference signal;
means for generating a replica of the echo signal from the reference signal;
means for subtracting the replica signal from the object signal and generating an error signal corresponding to the difference between the echo signal and the replica signal; and,
means for adapting the replica signal such that the error signal progressively approaches zero.

4. The telephone set of claim 3, wherein the means for adapting the replica signal comprises an algorithm that is a function of the error signal and a previous value of the replica signal.

5. The telephone set of claim 3, further comprising:
means for storing a previously generated echo replica signal;
means for detecting periods during which the reference signal and the object signal are both non-zero;
means for suspending the adapting of the replica signal during such periods; and,
means for subtracting the previously generated echo replica signal from the object signal during such periods.

6. The telephone set of claim 1, further comprising at least one codec arranged to convert at least one of the received and the transmitted signals between analog and digital signals.

7. The telephone set of claim 1, further comprising a digital signal processor, and wherein at least one of the first, second, third and fourth filters is implemented in the digital signal processor.

8. The telephone set of claim 1, wherein the receiver and the transmitter are incorporated in a hand set or a head set.

9. In a full duplex telephone comprising a portion of a closed loop in which an analog signal transmitted by the telephone is fed back onto an analog signal received by the telephone as a line echo and side tone signal, and in which the received signal is fed back onto the transmitted signal as an acoustic echo signal, a method for increasing the amount of gain that can be applied to the received signal by at least 50 dB without exceeding a total closed loop gain of unity, and without sacrificing the full duplex capability of the telephone, the method comprising:
canceling the line echo and side tone signal from the received signal to leave a remaining received signal;
canceling the acoustic echo signal from the transmitted signal to leave a remaining transmitted signal;
conditioning the level of the remaining transmitted signal to match the level of the remaining received signal;
combining the remaining received and conditioned remaining transmitted signals to form a modified received signal,
applying at least one of amplification, compression, and soft limiting the modified received signal to form an enhanced received signal;
detecting first periods during which the remaining transmitted signal is zero and the remaining received signal is non-zero;
detecting second periods during which the remaining received signal is zero and the remaining transmitted signal is non-zero;
measuring the level of the enhanced received signal during the first periods and storing the levels measured; and,
increasing or decreasing the level of the remaining received signal during the second periods such that the level of the enhanced received signal matches that of the enhanced received signal during the first periods.

10. The method of claim 9, further comprising;
converting the received and transmitted signals from analog to digital signals;
processing the converted signals in a digital signal processor; and,
converting the remaining transmitted signal and the modified received signal from digital to analog signals.

11. The method of claim 10, wherein canceling the line echo and side tone signal from the received signal comprises:
sampling the remaining transmitted signal and the received signal;
generating a replica of the line echo and side tone signal from the remaining transmitted signal;
subtracting the replica signal from the received signal and generating an error signal corresponding responding to the difference between the line echo and side tone signal and the replica signal; and,
adapting the replica signal such that the error signal progressively approaches zero.

12. The method of claim 11, wherein generating a replica of the line echo and side tone signal comprises:
approximating the impulse response of a path along which the line echo and side tone signal is fed back onto the received signal; and,
convolving the remaining transmitted signal and the impulse response of the line echo and side tone signal feedback path.

13. The method of claim 12, wherein adapting the replica signal comprises successively revising the approximation of the impulse response of the line echo and side tone signal feedback path such that the error signal progressively approaches zero.

14. The method of claim 13, wherein revising the approximation of the impulse response of the line echo and side tone signal feedback path comprises computing a succeeding approximation thereof from the error signal and a previous approximation thereof.

15. The method of claim 10, wherein canceling the acoustic echo signal from the transmitted signal comprises:
sampling the modified received signal and the transmitted signal;
generating a replica of the acoustic echo signal from the modified received signal;
subtracting the replica signal from the transmitted signal and generating an error signal corresponding to the difference between the acoustic echo signal and the replica signal; and,
adapting the replica signal such that the error signal progressively approaches zero.

16. The method of claim 15, wherein generating a replica of the acoustic echo signal comprises:
   approximating the impulse response of a path along which the acoustic echo signal is fed back onto the transmitted signal; and,
   convolving the modified received signal and the impulse response of the acoustic echo signal feedback path.

17. The method of claim 16, wherein adapting the replica signal comprises revising the approximation of the impulse response of the acoustic echo signal feedback path such that the error signal progressively approaches zero.

18. The method of claim 17, wherein revising the approximation of the impulse response of the acoustic echo signal feedback path comprises computing a succeeding approximation thereof from the error signal and a previous approximation thereof.

* * * * *